Dec. 31, 1963 H. SCHUDT 3,115,914
MACHINE FOR PEELING CUCUMBERS OR OTHER
ELONGATED VEGETABLES OR FRUITS
Filed Jan. 31, 1963 4 Sheets-Sheet 1

INVENTOR.
HANS SCHUDT
BY
ATTORNEY

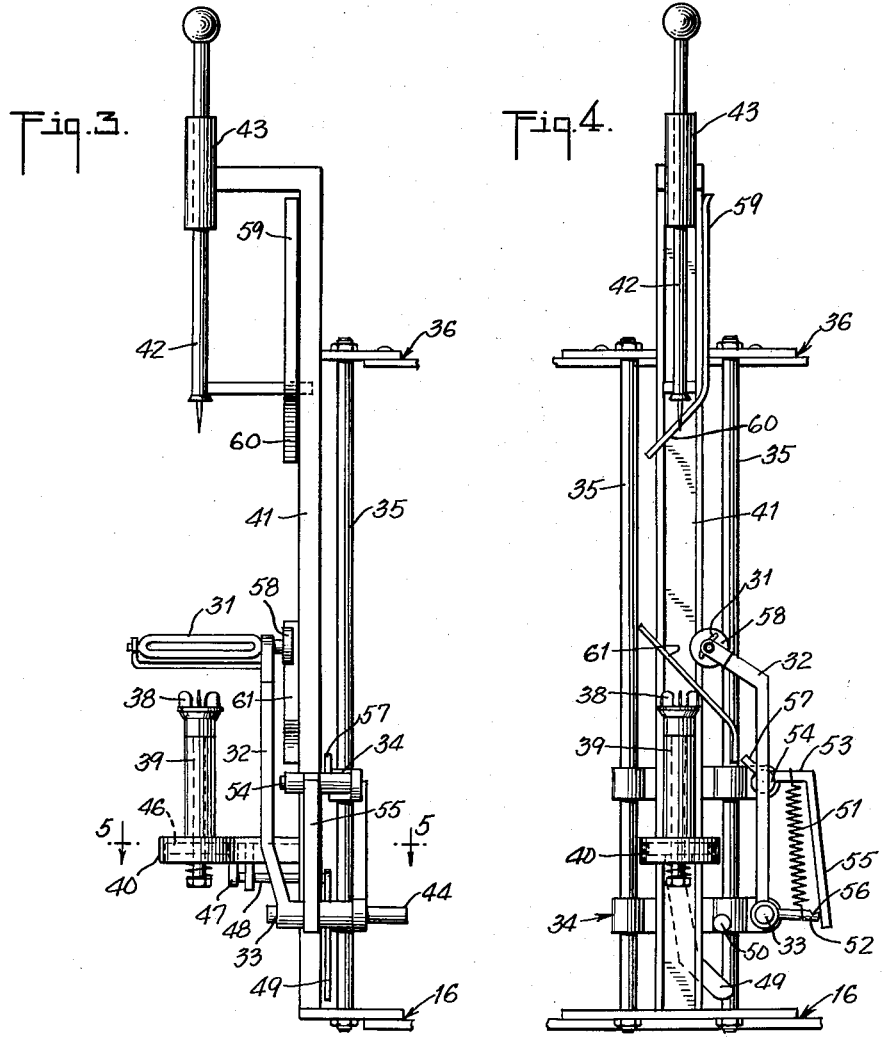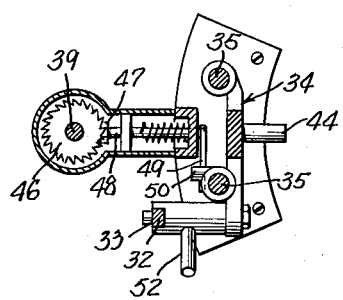

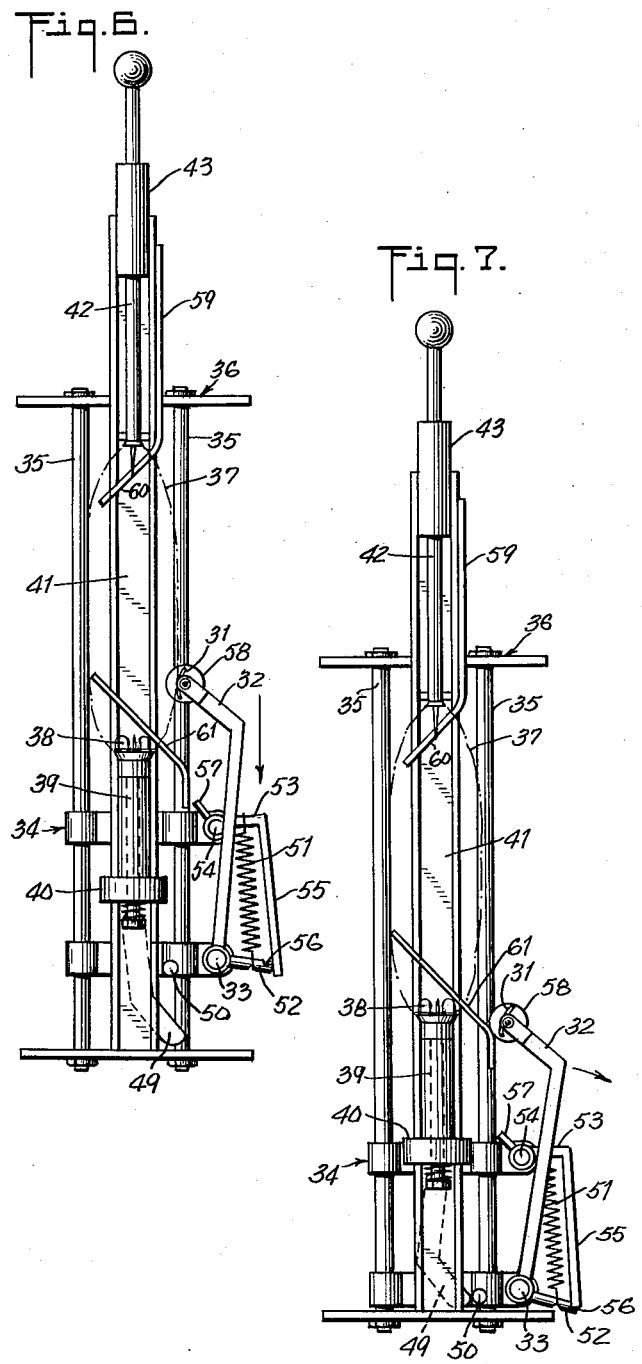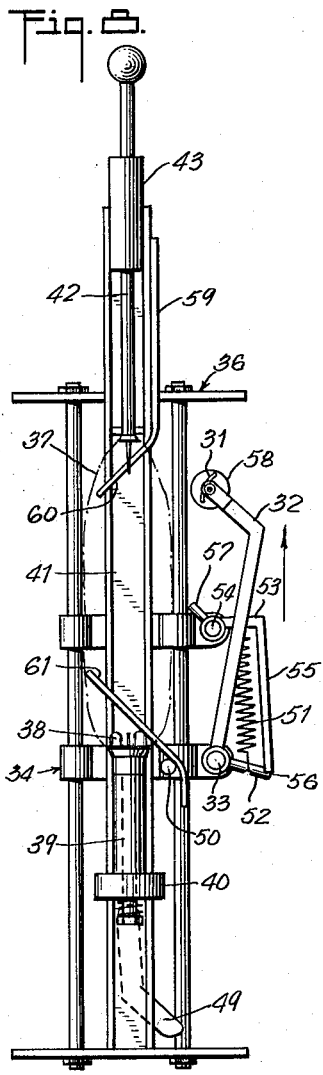

Dec. 31, 1963 H. SCHUDT 3,115,914
MACHINE FOR PEELING CUCUMBERS OR OTHER
ELONGATED VEGETABLES OR FRUITS
Filed Jan. 31, 1963 4 Sheets-Sheet 4
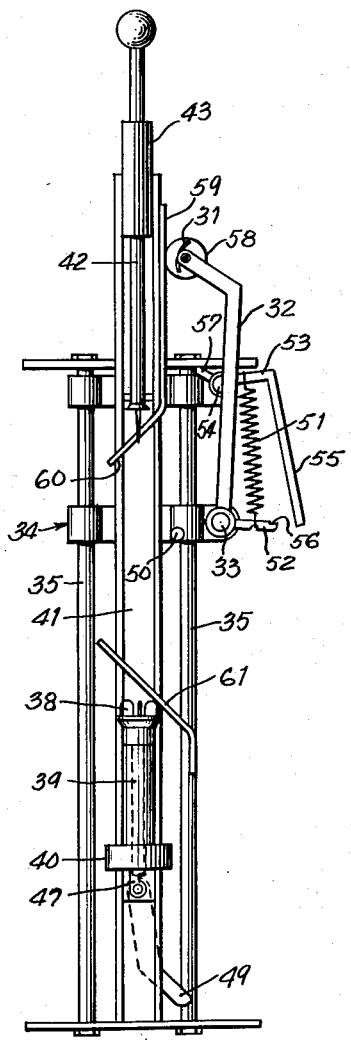
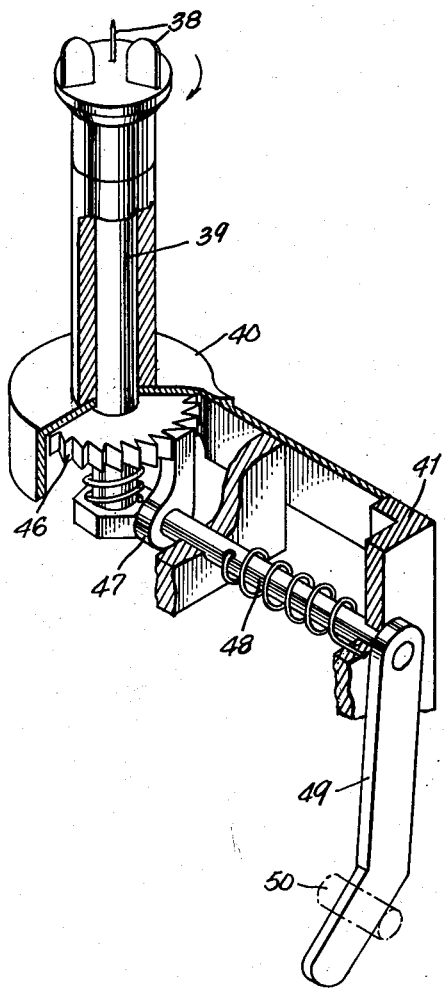
INVENTOR.
HANS SCHUDT
BY *Philip S. H. Bean*
ATTORNEY

United States Patent Office 3,115,914
Patented Dec. 31, 1963

3,115,914
MACHINE FOR PEELING CUCUMBERS OR OTHER ELONGATED VEGETABLES OR FRUITS
Hans Schudt, Darmstadterstrasse 64–66, Sprendlingen, near Frankfurt am Main, Germany
Filed Jan. 31, 1963, Ser. No. 255,370
4 Claims. (Cl. 146—43)

The invention herein disclosed relates to machines for peeling elongated vegetable products such as cucumbers and the like.

Objects of the invention are to provide simple, practical mechanism which will operate automatically to peel a number of products at the same time and in which the products to be treated can be readily placed and those which have been processed can be easily removed.

Other special objects of the invention are to provide this machine in a form consisting of but relatively few simple and rugged parts not liable to get out of order and not requiring special attention.

Further desirable objects and the novel features of construction, combination and relation of parts through which the purposes of the invention are attained are set forth and will appear in the course of the following specification.

The drawings forming part of the specification illustrate a practical, commercial embodiment of the invention but structure may be modified and changed as regards this illustration, all within the true intent and scope of the invention as herein defined and claimed.

FIG. 1 in the drawings is a broken vertical, sectional view of a machine incorporating features of the invention showing a peeling unit at the left on the active downstroke and the peeling unit at the right having finished its downstroke and open to receive an article to be peeled.

FIG. 3 is a broken, side elevation of one of the peeling units.

FIG. 4 is a broken front view of the same.

FIG. 5 is a broken horizontal sectional view taken on line 5—5 of FIG. 3 of the ratchet gearing for intermittently rotating the product supporting spindle.

FIGS. 6, 7, 8, 9 are broken and somewhat diagrammatic views illustrating successive positions of the parts in the peeling operation.

FIG. 10 is a perspective detail of the spindle turning ratchet mechanism.

Figure 1:
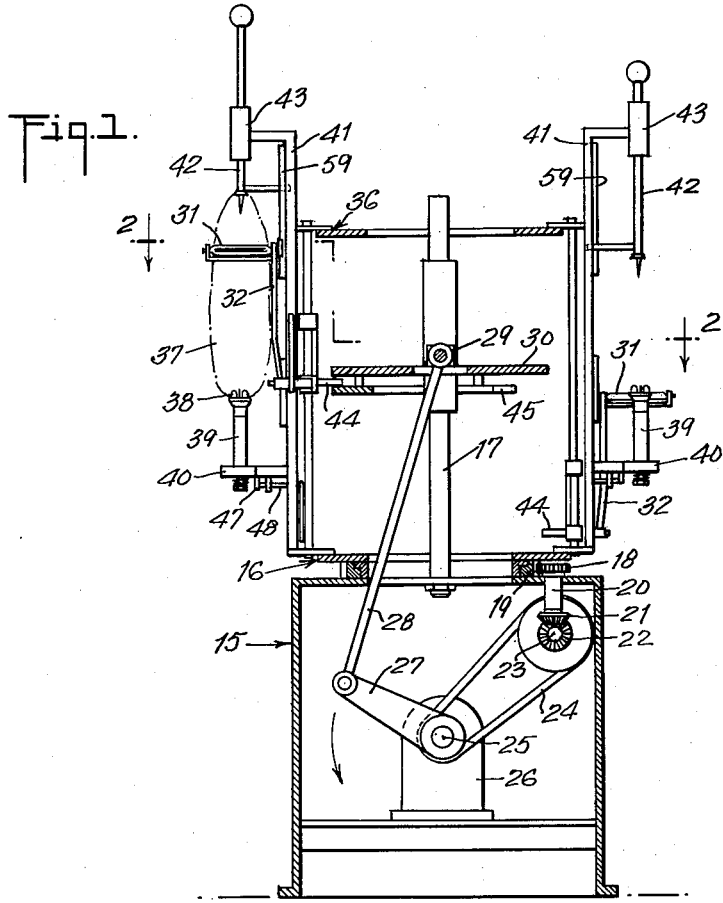
Figure 2:
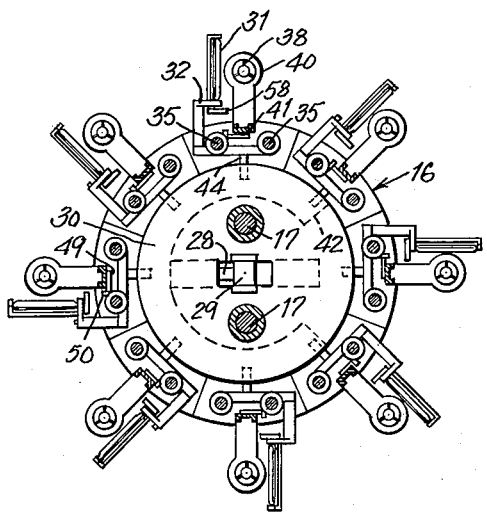
FIG. 2 is a horizontal section and part top plan view of the machine on substantially the plane of line 2—2 of FIG. 1.

In the machine illustrated there is a base or supporting structure 15 on which there is rotatably mounted a turntable 16 carrying the main operative parts of the peeling mechanism.

Specifically the turntable is shown as of annular formation providing an open center up through which project the stationary parallel posts 17.

The table is driven by pinion 18 in engagement with a circular rack 19 underneath the table, said pinion being on the upper end of an upright shaft 20 having a bevel gear 21 in mesh with a corresponding bevel gear 22 on the shaft 23 journaled in the base and driven by belt or chain 24 from shaft 25 of the motor 26.

This motor operated shaft 25 carries a crank 27 connected by connecting rod 28 with a sleeved member 29 vertically slidable on posts 17 and carrying a cam track 30 for reciprocating the peeling knives.

The knives for effecting the peeling operations are indicated at 31 on the upper ends of levers 32 journaled at their lower ends at 33 on the carriages or slides 34 operating over the circumferentially spaced pairs of parallel spaced guide rods 35 rising from the table and connected in their parallel relation at the top by a bracing and connecting ring 36.

The cucumbers or other articles to be peeled, such as indicated at 37, FIGS. 1 and 6, are supported vertically on the claws 38 of an upright shaft 39 journaled in a bracket 40 projected outwardly from an upstanding support 41 on the turntable, impaled in this position at the top by a pin 42 slidably guided in a supporting sleeve 43 on the upper end of standard 41.

Each of the vertically operable knife carrying slides has an inwardly projecting pin 44 engageable with the cam track 30 as shown at the left in FIG. 1.

This cam track has a gap 45 in the lower side of it of sufficient arcuate extent to provide a period of rest for the slides at the lower end of their travel, permitting unloading of peeled objects and placing of fresh articles to be peeled in the holding chucks.

These chucks or holders for the articles to be peeled are intermittently turned to bring fresh portions of the articles into line with the knives by ratchets 46, FIGS. 5 and 10, on the lower ends of the spindles 39 engaged by oscillating pawls 47 on shafts 48 having cam arms 49 engageable by projecting pins 50, on the slides at the end of the slide lowering movement, FIG. 7.

The knives are held in retracted position, clear of the impaled products on the upward stroke and are released for engagement with the products on the downward stroke by the special cam mechanism illustrated particularly in FIGS. 6, 7, 8, 9.

This mechanism includes in each unit a spring 51 connected with an arm 52 projecting from the pivotal center 33 of the knife carrying arm 32, tending to rock the knife arm inwardly toward the product, which spring is connected at its upper end with a lever 53 pivoted on the slide at 54 and having a downwardly extending latch portion 55 interlockingly engageable at 56, FIG. 7, with the lever arm 52 and an oppositely projecting trip arm 57, FIG. 9, engageable with the top, bracing ring 36.

When engaged with the arm 52, FIG. 7, the lever 55 holds the knife carrying arm 32 out with the knife clear of the product during the full upward stroke of the slide and when the top of this movement is reached the trip arm 57 by engagement with the top ring 36 unlatches lever arm 52, as shown in FIG. 9, permitting the knife lever to rock inwardly and the roll 58 at the upper end of the same to engage the straight upper portion of a cam plate 59.

The inclined cam face 60 at the lower end of this cam plate permits the knife lever to rock inwardly under pull of the spring 51 as the slide lowers enabling the knife to perform its cutting action on the downstroke of the knife carriage.

As the carriage approaches the lower end of its movement the cam roll 58, FIG. 7, engages a reversely inclined cam plate 61 to retract the knife and restore the knife carrying lever to the latched condition.

The upper knife infeeding cam 60 and the lower outfeeding cam 61 may be both mounted on the supporting standard 41.

The machine is simple and durable in construction and the action is continuous and automatic, the only attention required being to put the fresh products on the spindles and removing the peeled products while the knife carrying slides are at their lowest position and free of the raising and lowering cam track. The action is practically a continuous one, with a high production rate resulting from the operation on a number of articles all at the same time.

What is claimed is:

1. Machine for peeling cucumbers or other elongated natural products, comprising
   a base, a turntable mounted to rotate on said base, upright standards on said turntable, vertical product supporting spindles carried by said standards, upright guides on said turntable adjacent said standards, slides vertically operable on said upright guides, product paring knives shiftable on said slides into and out of engagement with products carried by said spindles, a vertically operable cam track mounted on the base above the turntable, connecting elements on the slides engageable with and disengageable from said cam track, said cam track having a gap in an arcuate portion of the same for releasing said connecting elements therefrom in a portion of the rotary travel of the turntable, drive means for imparting rotary movement to said turntable and vertical rising and lowering movement to said cam track, cam mechanism for holding said paring knives away from products on the spindles in upward travel of the slides and for effecting engagement of the knives with the products on the spindles in the downward movement of the slides, and means for imparting rotative movement to said product supporting spindles at the end of the downward movement of said slides.

2. The invention according to claim 1 in which there are center posts on said base on which said cam track is vertically slidable and said drive means for raising and lowering said cam track comprises a rotating crank and a connecting rod between said crank and cam track.

3. The invention according to claim 1 in which said cam mechanism for controlling said knives includes latch means for holding said knives away from the products on the spindles and a ring on the upper ends of said guides for releasing said latch means at the end of the upward movement of the slides.

4. The invention according to claim 1 in which said means for rotating the spindles includes ratchet gears on the lower ends of said spindles, pawls in engagement with said ratchet gears, cam levers for oscillating said pawls, and abutments on the slides engageable with said cam levers at end of the downward movement of the slides.

References Cited in the file of this patent

UNITED STATES PATENTS 2,139,704     Thompson et al.  --------  Dec. 13, 1938

FOREIGN PATENTS 399,045     Italy  ------------------  Oct. 15, 1942